US000001549H

United States Statutory Invention Registration [19]

[11] Reg. Number: H1549

[45] Published: Jun. 4, 1996

Yamaya

[54] SILVER HALIDE PHOTOGRAPHIC LIGHT-SENSITIVE MATERIAL

[76] Inventor: Yorihiro Yamaya, c/o Konica Corporation, 1 Sakura-machi, Hino-shi, Tokyo, Japan

[21] Appl. No.: 280,004

[22] Filed: Jul. 25, 1994

[30] Foreign Application Priority Data

Aug. 10, 1993 [JP] Japan ..... 5-198545

[51] Int. Cl.[6] ..... G03C 1/005; G03C 1/494

[52] U.S. Cl. ..... 430/567; 430/603; 430/605

[58] Field of Search ..... 430/567, 603, 430/605

[56] References Cited

U.S. PATENT DOCUMENTS

| | | | |
|---|---|---|---|
| 5,158,892 | 10/1992 | Sasaki et al. | 430/603 |
| 5,236,821 | 8/1993 | Yagihara et al. | 430/603 |
| 5,240,824 | 8/1993 | Takada et al. | 430/569 |
| 5,306,613 | 4/1994 | Yagihara et al. | 430/605 |
| 5,342,741 | 8/1994 | Morimoto et al. | 430/490 |
| 5,405,737 | 4/1995 | Shibata | 430/603 |

FOREIGN PATENT DOCUMENTS

| | | |
|---|---|---|
| 0458278A1 | 11/1991 | European Pat. Off. . |
| 3238444 | 10/1991 | Japan . |
| 1154236 | 6/1969 | United Kingdom . |

*Primary Examiner*—Charles T. Jordan
*Assistant Examiner*—Meena Chelliah

[57] ABSTRACT

A silver halide photographic light-sensitive material comprising a support having thereon a silver halide grain emulsion layer is provided, wherein the silver halide emulsion is chemical-sensitized with a selenium compound; and, at a time during the course of chemical sensitization, silver iodide fine grains is further added to the emulsion. The silver halide emulsion comprises tabular grains having an aspect ration of 3 or more.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC LIGHT-SENSITIVE MATERIAL

BACKGROUND OF THE INVENTION

This invention relates to a silver halide photographic light-sensitive material and particularly to a silver halide photographic light-sensitive material high in photosensitivity, low in fog, without producing any residual color-contamination and excellent in aging stability.

In recent years, a silver halide photographic light-sensitive material has been required to have a rapid processability as well as a high photosensitivity and a high image-quality. Particularly, with a photographic light-sensitive material for medically diagnostic use, an image information has been required to be high in photosensitivity and an image sharpness within a short period of time when diagnosing the illness of a patient.

Heretofore, many proposals for increasing the photosensitivity of a silver halide emulsion have been made so far. For example, Japanese Patent Open to Public Inspection (hereinafter referred to as JP OPI Publication) No. 63-305343/1988 discloses that a spectral sensitivity is increased by adding a sensitizing dye before carrying out a chemical ripening treatment and a development speed is accelerated at the same time.

However, in a rapid processing treatment, each of the time for fixing and washing treatments is shortened. Therefore, there raises such a problem that an sensitizing dye contained in a light-sensitive material is not dissolved out, so that it remains as a residual color-contamination. When reducing an amount of such a dye as mentioned above, a residual color-contamination may be avoided. However, it is not preferable because the photosensitivity of the subject light-sensitive material is lowered.

On the other hand, well-known processes for chemically sensitizing silver halide grains include, for example, a selenium sensitization in which a selenium compound is used, as well as a sulfur sensitization, a noble-metal sensitization and a reduction sensitization.

In the above-mentioned selenium sensitization process, however, on the other hand of the fact that a high photosensitivity can be obtained as compared to the other sensitization processes, there is such a defect that the raw stock preservability of a light-sensitive material cannot be excellent, so that a fog may be increasingly produced. Therefore, a further improvement thereof has been requested so far.

SUMMARY OF THE INVENTION

It is accordingly an object of the invention to provide a silver halide photographic light-sensitive material high in photosensitivity, low in fog without producing any residual color-contaminant and excellent in aging preservability.

The above-mentioned problems can be solved by the invention described as follows.

A silver halide photographic light-sensitive material is provided, comprising a support having thereon at least one silver halide emulsion layer containing silver halide grains (so-called a parent grains), wherein the silver halide grain emulsion is chemically sensitized with a selenium compound and silver iodide fine grains having a relatively smaller grain volume than that of the parent grains are added, during the course of chemical sensitization, in an amount of $1\times10^{-5}$ mols to $1\times10^{-2}$ mols per mol of the silver halide of the parent grain.

DETAILED DESCRIPTION OF THE INVENTION

In the silver halide emulsion layers relating to the invention, the silver halide grains therein (i.e., contained hereinafter may be referred to the parent grains) may be the regular crystal grains namely; those isotropically grown up, such as those of the cubic, octahedral and tetradecahedral shape; the polyhedral crystal grains, such as those of the spherical type; those comprising twinned crystals each having an tabular shape plane dislocation or the mixture or composite type thereof. Among them, a tabular-shaped silver halide grains may preferably be used.

The emulsion applicable to the silver halide photographic light-sensitive materials of the invention may be prepared in well-known processes. For example, it may be prepared in the following processes, namely, the process described in "Emulsion Preparation and Types" appeared in Research Disclosure (hereinafter sometimes abbreviated to as RD) No. 17643 (Dec., 1978), pp. 22–23; or, ibid., (RD) No. 18716 (Nov., a979), p. 648.

The emulsions applicable to a silver halide photographic light-sensitive material of the invention may be prepared in such a process as described in T. H. James, "The Theory of the Photographic Process", 4th Ed., Macmillan Co., 1977, pp. 38– 104, G. F. Duffin, "Photographic Emulsion Chemistry", Focal Press Co, 1966, P. Glafkides, "Chemie et Physique Photographique", Paul Motel Co., 1967, or V. L. Zelikman et al, "Making and Coating Photographic Emulsion", Focal Press Co., 1964.

To be more concrete, such an emulsion as mentioned above may be prepared under a solution condition such as an acidic process, an ammoniacal process and a neutral process, by a precipitation process such as a reverse precipitation process, a double-jet precipitation process and a controlled double-jet precipitation process and the combination processes thereof.

In the emulsions applicable to a silver halide photographic light-sensitive material of the invention, the preferable embodiments thereof include, for example, a monodispersed grain emulsion in which silver iodide is localized inside the grain.

The silver halide emulsions preferably applicable to the invention include, for example, an internally high-iodine containing monodispersed grain emulsion of which is disclosed in Japanese Patent Publication Open to Public Inspection (hereinafter referred to as JP OPI Publication) Nos. 59-177535/1984, 61-802237/1986, 61-132943/1986 and 63-49751/1988. As for the crystal habits of the grain crystals, it is also allowed that a cube, an octahedron, a tetradecahedron, and an in-between of a {111} plane and a {100} plane may freely be mixed in.

The term, "monodispersed grains", stated herein means silver halide grains of which at least 95% by number or by weight have each a grain-size within the range of ±40% of the average grain-size of the total grains and, preferably within the range of ±30% thereof. The term, "monodispersity", herein stated is defined in JP OPI Publication No. 60-162244/1985 and means therein that a variation coefficient grain sizes is not more than 20%.

The crystal structure of silver halide may be comprised of a silver halide composition different between the interior and the exterior thereof. To be more concrete, a silver halide has a core/shell structure comprising a core and a shell having one or more layers different in a halide composition from that of the core. The silver iodide content of a highly iodine containing portion is to be within the range of 20 to 40 mol % and, preferably 20 to 30 mol %.

The processes of preparing a monodisperse emulsion relating to the invention have been well-known. The process thereof is detailed in, for example, J. Phot. Sci., 12, pp. 242–251, (1963), JP OPI Publication Nos. 48-36890/1973, 52-16364/1977, 55-142329/1980 and 58-49938/1983, British Patent No. 1,413,748, and U.S. Pat. Nos. 3,574,628 and 3,655,394.

In a process for preparing the above-mentioned monodisperse type emulsion, it is particularly preferable to make use of seed crystals to grow them up further by supplying silver ion and halide ion thereto.

The processes of preparing a core/shell type emulsion have been well-known. For the details thereof, the processes described in, for example, British Patent No. 1,027,146, U.S. Pat. Nos. 3,505,068 and 4,444,877 and JP OPI Publication No. 60-143331/1986, may be referred.

To a silver halide photographic light-sensitive material of the invention, it is preferable to make use of a tabular-shaped grain having an aspect ratio (that is, a ratio of a grain-size to a grain thickness) of not smaller than 3.

An average grain-size of the above-mentioned tabular-shaped silver halide grains is to be within the range of, preferably, 0.3 to 3.0 μm and, particularly 0.5 to 1.5 μm.

A tabular-shaped silver halide emulsion relating to the invention is to have an average value of the grain-size/the grain thickness (an aspect ratio) of not smaller than 3, preferably within the range of 3 to 20 and, particularly 3 to 10.

An average grain thickness of silver halide grains of the invention is to be not thicker than 1.0 μm, preferably not thicker than 0.5 μm and, further preferably not thicker than 0.3 μm.

The advantages of such a tabular-shaped silver halide grains as mentioned above are that a spectral sensitization efficiency can be improved and the improvements in graininess and sharpness of an image can also be achieved. The advantages thereof are disclosed in, for example, British Patent No. 2,112,157, and U.S. Pat. Nos. 4,439,520, 4,433,048, 4,414,310 and 4,434,226.

In the invention, a diameter of a tabular-shaped silver halide grain is defined, from the observation of the electron microscopic photograph of the grains thereof, as a diameter of a circle having the same projected area as that of the grain.

In the invention, a thickness of a tabular-shaped silver halide grain is defined as the shortest distance between the distances of the two parallel planes each constituting the tabular-shaped silver halide grain.

A thickness of a tabular-shaped silver halide grain can be obtained from an electron microscopic photograph having an shadowing image of the silver halide grains, or from an electron microscopic photograph of a cross-sectioned sample which is prepared by coating a silver halide emulsion on a support and then dried up.

For obtaining an average aspect ratio, at least 100 pieces of samples are to be measured.

In a silver halide emulsion of the invention, the tabular-shaped silver halide grains thereof are accounted for by not less than 50%, preferably not less than 60% and, more preferably not less than 70% of the whole silver halide grains.

A tabular-shaped silver halide emulsion relating to the invention is preferably a monodispersed grain emulsion. The expression, ". . . monodispersed", herein means that a grain-size variation coefficient (i.e., a ratio of a standard deviation of grain-size distribution/an average grain-size× 100) is not more than 25%, preferably not more than 20% and, more preferably not more than 15%.

A silver halide emulsion relating to the invention may be comprised of any one of silver chloride, silver bromide, silver iodide, silver chlorobromide, silver iodobromide, silver chloroiodobromide and so forth. From the viewpoint of a high photosensitivity, silver iodobromide is preferred, and the average silver iodide content thereof is within the range of 0.1 to 4.0 mol % and, preferably 0.5 to 3.0 mol %.

Further from the viewpoint of a rapid processability, silver chloroiodobromide is preferred. Silver chloride may be contained in any portion of the grain and, it is preferable to localize silver chloride in the outermost shell of the grain. An average silver chloride content of the outermost shell is to be not less than 0.3 mol %, preferably within the range of 1 to 60 mol % and, more preferably 5 to 40 mol %.

In a tabular-shaped silver halide emulsion relating to the invention, the halide composition thereof may be even within the grain, or silver iodide may also be localized. It is, however, preferable to use an emulsion containing silver iodide localized in the central portion of the grain. The processes of preparing a tabular-shaped silver halide emulsion may also be referred to JP OPI Publication Nos. 58-113926/1983, 58-113927/1983, 58-113934/1983 and 62-1855/1987 and European Patent Nos. 219,849 and 219,850. The processes of preparing a monodispersed tabular-shaped silver halide emulsion may be referred to JP OPI Publication No. 61- 6643/1986.

In a process of preparing a tabular-shaped silver iodobromide emulsion having a high aspect ratio the emulsion can be prepared by adding an aqueous silver nitrate solution to an aqueous gelatin solution while keeping the pBr thereof to be not more than 2, or an aqueous silver nitrate solution and an aqueous halide solution are added at the same time to an aqueous gelatin solution to produce twinned crystal seed grains and the seed grains produced are then grown up in a double-jet precipitation method. The sizes of tabular-shaped silver halide grains can be controlled by adjusting a temperature in forming the grains and the rates of adding a silver salt solution and a halide solution.

In a silver halide emulsion (hereinafter referred to as a parent grain emulsion) relating to the invention, both of the average silver iodide content and the average silver chloride content can be controlled by varying a composition of an aqueous halide solution to be added, that is, a ratio of the bromide, iodide and chloride each to be added. If required, a silver halide solvent such as ammonia, thioether and thiourea may be applied when preparing the parent grains.

For removing a soluble salts from an emulsion, such a washing method as a noodle-washing method or a flocculation-washing method may be carried out. The preferable washing method includes, for example, a method with the use of an aromatic hydrocarbon type aldehyde resin containing a sulfo group, such as that described in JP Examined Publication No. 35-16086/1960 a desalting method with the use of a polymeric flocculant such as exemplified compounds G3 and G8 given in JP OPI Publication No. 63-158644/1988.

A emulsion of the invention is selenium-sensitized with a selenium compound.

In a parent grain emulsion relating to the invention, a chemically ripening temperature may optimally be determined. However, it may be within the range of, preferably 20° C. to 90° C., more preferably 30° C. to 80° C. and, particularly 35° C. to 70° C.

As for a selenium sensitizer applicable to the invention, the selenium compound disclosed in any patents having so far been well-known may be used. A selenium sensitization is usually carried out by adding an unstable type selenium compound and/or a non-unstable type selenium compound to a silver halide emulsion and then by stirring the emulsion at a high temperature, preferably at a temperature of not lower than 40° C., for a given period of time. An unstable type selenium compound applicable thereto include, preferably, those described in, for example, JP Examined Publication Nos. 44-15748/1969 and 43-13489/1968. The examples thereof include an isoselenocyanate (such as an aliphatic isoselenocyanate, e.g., allyl isoselenocyanate) a selenourea, a selenoketone, a selenoamide, a selenocarboxylic acid (such as 2-selenopropionic acid and 2-selenobutyric acid), a selenoester, a diacylselenide (such as bis(3-chloro-2,6-dimethoxybenzoyl)selenide), a selenophosphate, a phosphine selenide and a colloidal metal selenium.

A non-unstable type selenium compound applicable to the invention include, for example, those described in JP Examined Publication Nos. 46-4553/1971, 52-34492/1977 and 52- 34491/1977. Such a non-unstable type selenium compound as mentioned above include, for example, selenious acid, potassium selenocyanide, a selenazole, a quaternary salt of a selenazole, diaryl selenide, diaryl diselenide, dialkyl selenide, dialkyl diselenide, 2-selenazolidine dione, 2selenoxazolidine dione and the derivatives thereof.

The preferable selenium compounds include, for example, those represented by the following formulas (1) and (2).

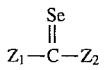

Formula (1)

wherein $Z_1$ and $Z_2$ may be the same with or different from each other and represent each an alkyl group (such as that of methyl, ethyl, t-butyl, adamantyl or t-octyl), an alkenyl group (such as that of vinyl or propenyl), an aralkyl group (such as that of benzyl or phenethyl), an aryl group (such as that of phenyl, pentafluorophenyl, 4-chlorophenyl, 3-nitrophenyl, 4-octyl sulfamoyl phenyl or naphthyl), a heterocyclic group (such as that of pyridyl, thienyl, furyl or imidazolyl), $—NR_1(R_2)$, $—OR_3$ or $—SR_4$.

$R_1$, $R_2$, $R_3$ and $R_4$ may be the same with or different from each other and represent each an alkyl, aralkyl, aryl or heterocyclic group. The alkyl, aralkyl, aryl or heterocyclic group include the same examples given for $Z_1$; provided, however, that $R_1$ and $R_2$ may also represent each a hydrogen atom or an acyl group (such as that of acetyl, propanoyl, benzoyl, heptafluorobutanoyl, difluoroacetyl, 4-nitrobenzoyl, naphthoyl or 4-trifluoromethylbenzoyl).

In formula (1), $Z_1$ represents preferably an alkyl, aryl or $—NR_1(R_2)$ and $Z_2$ represents $—NR_5(R_6)$. $R_1$, $R_2$, $R_5$ and $R_6$ may be the same with or the different from each other and represent each a hydrogen atom, an alkyl group, an aryl group or an acyl group.

In formula (1), it represents more preferably N,N-dialkyl selenourea, N,N,N'-trialkyl-N'-acyl selenourea, tetralkyl selenourea, N,N-dialkyl-aryl selenoamide or N-alkyl-N-aryl selenoamide.

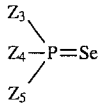

Formula (2)

wherein $Z_3$, $Z_4$ and $Z_5$ may be the same with or the different from each other and represent each an aliphatic group, an aromatic group, a heterocyclic group, $—OR_7$, $—NR_8(R_9)$, $—SR_{10}$, $—SeR_{11}$, —X or a hydrogen atom.

$R_7$, $R_{10}$ and $R_{11}$ represent each an aliphatic group, an aromatic group, a heterocyclic group, a hydrogen atom or a cation. $R_8$ and $R_9$ represent each an aliphatic group, an aromatic group, a heterocyclic group or a hydrogen atom. X represents a halogen atom.

In formula (2), $Z_3$, $Z_4$, $Z_5$, $R_7$, $R_8$, $R_9$, $R_{10}$ and $R_{11}$ represent each an aliphatic group including, for example, a straight-chained, branched or cyclic group of alkyl, alkenyl, alkinyl, aralkyl (such as a group of methyl, ethyl, n-propyl, isopropyl, t-butyl, n-butyl, n-octyl, n-decyl, n-hexadecyl, cyclopentyl, cyclohexyl, allyl, 2-butenyl, 3-[pentenyl, propargyl, 3-pentenyl, benzyl or phenethyl).

$Z_3$, $Z_4$, $Z_5$, $R_7$, $R_8$, $R_9$, $R_{10}$ and $R_{11}$ represent each an aromatic group including, for example, a monocyclic or condensed-cyclic aryl group (such as a group of phenyl, pentafluorophenyl, 4-chlorophenyl, 3-sulfophenyl, naphthyl or 4-methylphenyl).

$Z_3$, $Z_4$, $Z_5$, $R_7$, $R_8$, $R_9$, $R_{10}$ and $R_{11}$ represent each a heterocyclic group including, for example, a saturated or unsaturated heterocyclic group having a 3 to 10 membered ring containing at least one of nitrogen, oxygen and sulfur atoms, (such as a group of pyridyl, thienyl, furyl, thiazolyl, imidazolyl or benzimidazolyl).

$R_7$, $R_{10}$ and $R_{11}$ represent each a cation including, for example, an alkali-metal atom or ammonium; and X represents a halogen atom such as that of fluorine, chlorine, bromine or iodine.

$Z_3$, $Z_4$ or $Z_5$ represents preferably an aliphatic group, an aromatic group or $-OR_1$; and $R_7$ represents an aliphatic group or an aromatic group. In formula (2), the above-mentioned groups include, more preferably, a trialkyl phosphine selenide, triaryl phosphine selenide, trialkyl selenophosphate or triaryl selenophosphate.

Now, examples of the compounds represented by formulas (1) and (2) will be given below. However, the invention shall not be limited thereto.

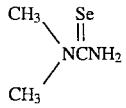

1.

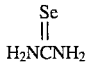

2.

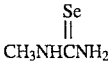

3.

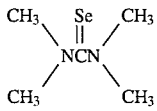

4.

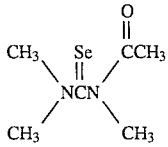

5.

-continued
6.
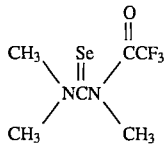
7.
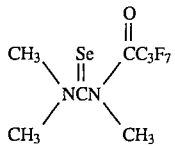
8.
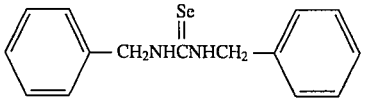
9.
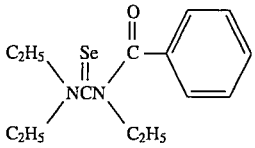
10.
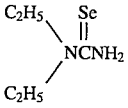
11.
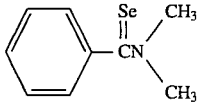
12.
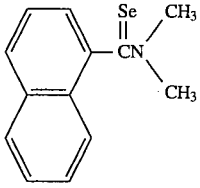
13.
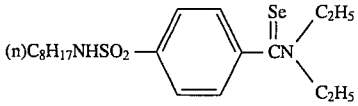
14.
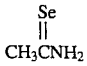
15.
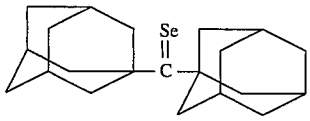
16.
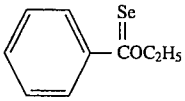
17.
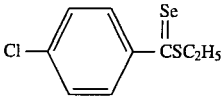
18.
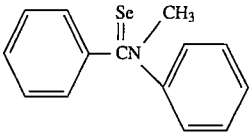
-continued
19.
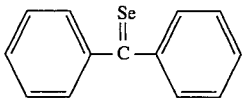
20.
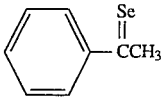
21.
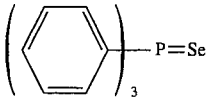
22.
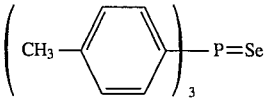
23. $(n\text{-}C_4H_9)_3P{=}Se$
24.
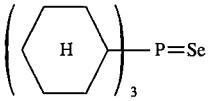
25.
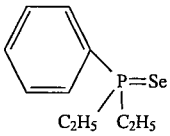
26.
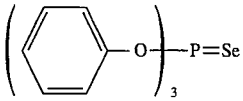
27.
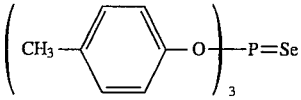
28. $(n\text{-}C_4H_9O)_3P{=}Se$
29.
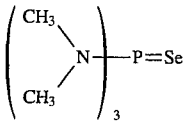
30. $(C_2H_5O)_3P{=}Se$
31.
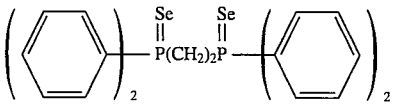
32. $(n\text{-}C_8H_{17})_3P{=}Se$
33.
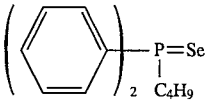
34.
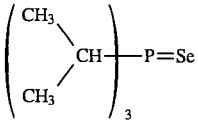

-continued

35. 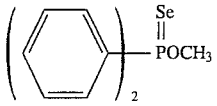

36. 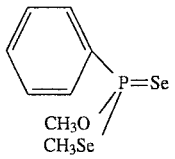

37. 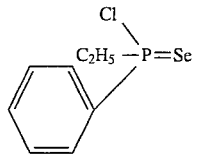

38. 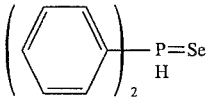

39. 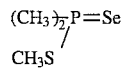

The above-mentioned selenium sensitizers are each dissolved in an organic solvent such as methanol or ethanol, or in the solvents in combination and the resulting solution is then added in the course of carrying out chemical sensitization (or chemical repening) and, preferably immediately before starting the chemical sensitization. The selenium sensitizer shall not be limited to any single kind thereof, but they may be used in combination. It is also allowed to make combination use of the above-mentioned unstable selenium compounds and non-unstable selenium compounds. A selenium sensitizer applicable to the invention may be used in an amount of, preferably not less than $1\times10^{-8}$ per mol of silver halide used and, more preferably within the range of not less than $1\times10^{-7}$ mols to $3\times10^{-5}$ mols; provided that the amount thereof may be varied according to the activity thereof, the kinds and sizes of silver halide used and the temperatures and periods of carrying out a ripening treatment. When making use of a selenium sensitizer, the chemical ripening temperature is preferably not lower than 45° C. and, more preferably within the range of not lower than 50° C. to not higher than 80° C. Any pH and pAg thereof may freely be used. For example, the effects of the invention can be obtained when the pH thereof is within the range of 4 to 9. It is also effective to carry out a selenium sensitization in the presence of a silver halide solvent.

A silver halide solvent applicable to the invention include, for example, (a) an organic thioether described in U.S. Pat. Nos. 3,271,159, 3,531,289 and 3,574,628, JP OPI Publication Nos. 54-1019/1979 and 54-158917/1979, (b) a thiourea derivative described in JP OPI Publication Nos. 53- 82408/1978, 55-77737/1980 and 55-2982/1980, (c) a silver halide solvent having a thiocarbonyl group sandwiched between an oxygen atom or a sulfur atom and a nitrogen atom, described in JP OPI Publication No. 53-144319/1978, (d) an imidazole, (e) a sulfite, and (f) thiocyanate. Among them, the particularly preferable solvents include, for example, thiocyanate and tetramethyl thiourea. In the case of making use of thiocyanate, for example, it is preferably used in an amount within the range of $1\times10^{-4}$ to $1\times10^{-2}$ mols per mol of silver halide used, provided that an amount of a solvent applied thereto may be varied by the kinds thereof. A silver halide emulsion of the invention can achieve a high photosensitivity and a low fog when making use in combination with a sulfur sensitization and/or a gold sensitization in the course of carrying out a chemical sensitization. The above-mentioned sulfur sensitization is usually carried out by adding a sulfur sensitizer and the subject emulsion is stirred at a high temperature of, preferably not lower than 40° C. for a specific period of time. The above-mentioned gold sensitization is usually carried out by adding a gold sensitizer and the subject emulsion is stirred at a high temperature of, preferably not lower than 40° C. for a period of time. To the above-mentioned sulfur sensitization, a well-known sulfur sensitizer may be used. For example, they include a thiosulfate, a thiourea, allylisothiacyanate, cystine, a p-toluene thiosulfonate and rhodanine. The amount thereof to be added is preferably within the range of $5\times10^{-8}$ to $5\times10^{-5}$ mol/molAgX. Gold sensitizers include a chloroaurate such as potassium chloroaurate, a gold-thioarea complex, auric trichloride, an auric thiocyanate, potassium iodoaurate, and pyridyl trichlorogold. An addition amount thereof is preferably $5\times10^{-7}$ to $5\times10^{-3}$ mol/molAgX.

In a silver iodide fine grain relating to the invention, the grain-size thereof is preferably not larger than 0.12 μm, more preferably not larger than 0.09 μm and, particularly not larger than 0.06 μm.

A cubic crystal type y-AgI and a hexagonal crystal type β-AgI are generally known as silver iodide, however, when applying silver iodide fine grains to the invention, they may have any crystal structures or the mixtures thereof.

Silver iodide fine grains applicable to the invention are preferable to be excellent in monodispersity, and they are also preferable to be prepared by a double-jet precipitation method while controlling the temperature, pH and pAg.

The above-mentioned silver iodide fine grains are preferable to be added in an amount of, preferably not more than $1\times10^{-2}$ mols per mol of a parent grain emulsion used and, more preferably within the range of $1\times10^{-4}$ mols to $2\times10^{-3}$ mols per mol of the parent grain emulsion used.

Silver iodide fine grains of the invention may be added at a time from a chemical ripening step to the point of time immediately prior to a coating step and, preferably in the course of carrying out a chemical ripening step. The term, "a chemical ripening step", stated herein means that the courses between the point of time when completing a desalting treatment after forming the grains of a parent grain emulsion to the point of time when completing and stopping the chemical ripening. As for the methods for stopping chemical ripening, there include the known methods such as temperature lowering, pH-lowering and making use of a chemical ripening stopper. Taking the stability of an emulsion into consideration, a method of making use of a chemical ripening stopper is preferred. The known chemical ripening stoppers include, for example, a halide (such as potassium bromide and sodium chloride) and an organic compound (such as 4-hydroxy-6-methyl- 1,3,3a,7-tetrazaindene) known as an antifoggant or a stabilizer. They are used singly or in combination with plural compounds.

As mentioned above, silver iodide fine grains may be added dividedly into several times with some time intervals, or it is also allowed that a further chemically ripened emulsion is added after adding silver iodide fine grains.

When adding silver iodide fine grains, a parent grain emulsion is to have a temperature within the range of, preferably, 30° to 80° C. and, more preferably, 40° to 65° C.

The invention is to be embodied, preferably, under the conditions where a part of or all of the silver iodide fine grains are to disappear in the course from the completion of the addition thereof to the point of time immediately before carrying out a coating and, more preferably, under the conditions where not less than 20% of silver iodide fine grains added thereto are to disappear immediately before carrying out a coating.

The above-mentioned disappeared grains can be quantitatively determined in such a manner that, upon centrifuging an emulsion or a coating solution under the suitable conditions after adding silver iodide fine grains thereto, the absorption spectra of the resulting supernatant are measured and the measured spectra thereof are then compared to the silver halide fine grains having an already-known density.

A silver halide emulsion relating to the invention may be spectrally sensitized with a sensitizing dye.

As for the sensitizing dyes applicable to the invention, any one of the commonly applicable sensitizing dyes may be used, such as cyanine, merocyanine or complexed cyanine, complexed merocyanine, styryl and hemicyanine.

The sensitizing dyes applicable to the invention include, for example, those given in U.S. Pat. Nos. 3,522,052, 3,619,197, 3,713,828, 3,615,643, 3,615,632, 3,617,293, 3,628,964, 3,703,377, 3,666,480, 3,667,960, 3,679,428, 3,672,897, 3,769,026, 3,556,800, 3,615,613, 3,615,635, 3,615,638, 3,705,809, 3,632,349, 3,677,65 , 3,770,440, 3,770,449, 3,769,025, 3,745,014, 3,713,828, 3,567,458, 3,625,698, 2,526,632 and 2,503,776, JP OPI Publication No. 48-76525/1973, and Belgian Patent No. 691,807. Now, some concrete examples of the sensitizing dyes preferably applicable to the invention will be given below.

1

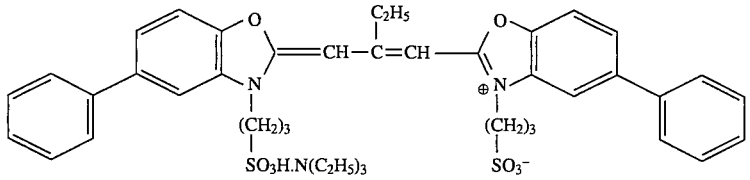

2

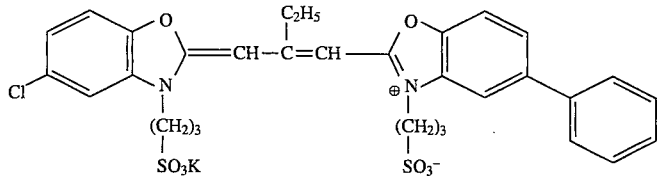

3

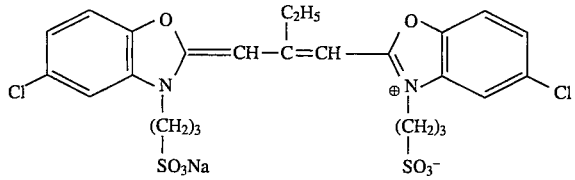

4

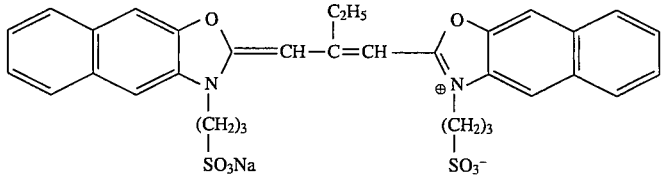

5

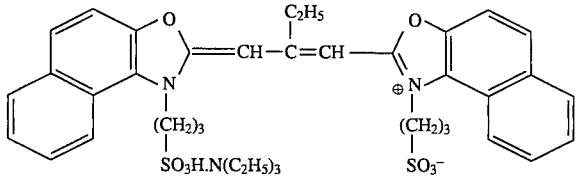

6

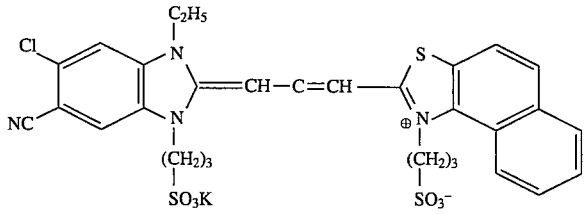

-continued

7

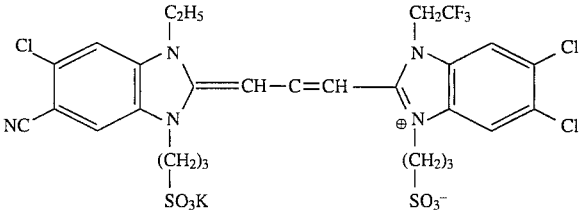

8

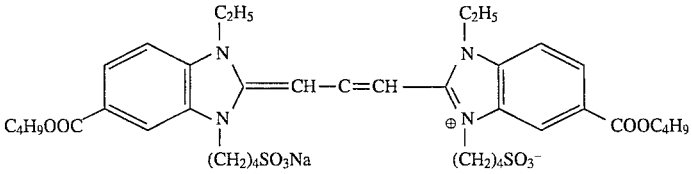

The above-given dyes may readily be synthesized with reference to the conventionally known processes detailed in, for example, F. M. Harmer, "Cyanine Dyes and Related Compounds", 1964, Interscience Publishers.

A sensitizing dye mat be added in an amount within the range of, preferably $1\times10^{-4}$ mols to $1\times10^{-3}$ mols per mol of silver halide used and, more preferably $2\times10^{-4}$ mols to $8\times10^{-4}$ mols, provided, however, that the amounts thereof may be varied by the kinds of a dye, the purposes of a spectral sensitization or the compositions of an emulsion. A sensitizing dye may be added any time from the point of time when completing a parent grain growing step to the point of time before completing a chemical sensitization step. Such a dye as mentioned above is added upon dissolving it in a hydrophilic solvent such as methanol or ethanol.

EXAMPLES

Now, the invention will concretely be detailed with reference to the following examples.

Example 1

1) Seed emulsion preparation 1

The monodispersed cubic silver iodobromide grains having an average grain-size of 0.3 μm and containing 2 mol % of silver iodide were prepared in a double-jet precipitation method, while controlling the temperature to be 60° C., the pAg to be 2.0 and the pH to be 2.0. The resulting emulsion was desalted at 40° C. by making use of an aqueous solution of Demol N (an aldehyde condensate of sodium naphthalene sulfonate manufactured by Kao-Atlas Corp.) and magnesium sulfate, and the desalted matter was then redispersed in an aqueous gelatin solution, so that a seed emulsion could be prepared.

2) Grains grown up from the seed emulsion

The resulting seed emulsion was dispersed in an aqueous gelatin solution being kept at 40° C. and the pH thereof was adjusted to be 9.7 by making use of aqueous ammonia and acetic acid. To the resulting solution, an aqueous ammoniacal silver nitrate solution and an aqueous solution of potassium bromide and potassium iodide were each added in a double-jet precipitation method.

In the course of adding the two aqueous solutions, the pAg and pH were adjusted to be 7.3 and 9.7, respectively, so that a layer having a silver iodide content of 35 mol % could be formed. Next, an aqueous ammoniacal silver nitrate solution and an aqueous potassium bromide solution were each added thereto in a double-jet precipitation method. The pAg thereof was kept to be 9.5 until 95% of an objective grain-size thereof could reached and the pH thereof was continuously varied during the pH thereof was changed from 8.0 into 9.0. Thereafter, the pAg thereof was adjusted to be 11.0 and while keeping the pH thereof to be 8.0, the grain-size thereof was grown up to reach the objective grain-size. Successively, the pH was lowered to 6.0 by making use of acetic acid and exemplified compound 3 was added thereto as a spectrally sensitizing dye in an amount of 400 mg/mol of AgX. Thereafter, a desalting treatment was carried out in the same manner as mentioned above and the resulting desalted matter was then dispersed in an aqueous gelatin solution.

In the above-mentioned manner, monodisperse type silver iodobromide emulsions (A), (B) and (C) each comprising round-shaped tetradecahedral, regular crystal grains were so prepared as to have an average silver iodide contents of 2.0 mol %, the average grain-sizes of 0.40 μm, 0.65 μm and 1.00 μm and the variation coefficients of 17%, 16% and 16%, respectively. Next, the resulting emulsions were mixed up in a proportion of 15:65:20 by weight, so that regularly crystallized emulsion Em-1 could be prepared.

To the resulting Em-1, suitable amounts of sodium thiosulfate, chloroauric acid and ammonium thiocyanate were each added and then exemplified compounds 4 and 21 which were each of the selenium sensitizers relating to the invention were added thereto, so that a chemical ripening treatment was carried out at 48° C. Immediately before adding the chemical sensitizers thereto, exemplified sensitizing dye 3 was added thereto in an amount of mol per mol of silver halide used, such as shown in Table If so that a spectral sensitization was carried out. After starting the chemical sensitization, Potassium iodide (KI), for comparing it to the silver iodide fine grains of the invention was added by taking 30 minutes as shown in Table 1. Further, a ripening treatment was carried out by taking 20 minutes at the same temperature and 4 -hydroxy-6-methyl-1,3,3a,7-tetrazaindene was then added in an amount of 2.4 g per mol of silver halide used. Thereafter, the temperature was lowered and the ripening treatment was stopped in operation. The following additives was added to each of the resulting 15 kinds of emulsions, so that the coating solutions could be prepared, respectively.

The amounts added are each shown by an amount per mol of silver halide used therein.

| | |
|---|---|
| 1-phenyl-5-mercaptotetrazole | 10 mg |
| 1-trimethylol propane | 14 g |
| t-butyl-catechol | 68 mg |
| Polyvinyl pyrrolidone | 850 mg |

-continued

| | |
|---|---|
| (having a molecular weight of 10,000) | |
| Styrene-maleic anhydride copolymer | 2.0 g |
| Nitrophenyl-triphenyl phosphonium chloride | 50 mg |
| Ammonium 1,3-dihydroxybenzene-4-sulfonate | 1.7 g |
| 1,1-dimethylol-1-bromo-1-nitromethane | 6.2 mg |
| $nC_4H_9OCH_2CH(OH)CH_2N(CH_2COOH)_2$ | 700 mg |
| 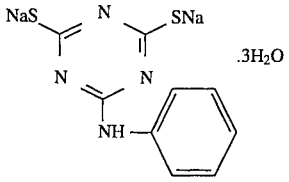 | 42 mg |
| 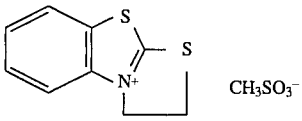 | 28 mg |
| 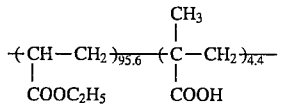 | 18 mg |

The additives applied to a protective layer solution were as follows. The amounts thereof added are each herein indicated by an amount per gram of gelatin.

| | |
|---|---|
| A matting agent comprising polymethyl methacrylate having an average particle-size of 5 μm | 21 mg |
| A matting agent comprising polymethyl methacrylate having an average particle-size of 3 μm | 28 mg |
| Glyoxal | 50 mg |
| 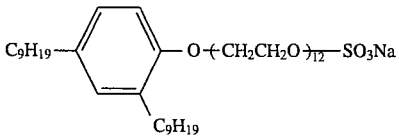 | 20 mg |
| 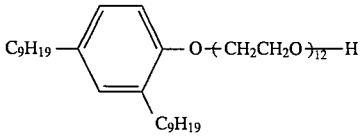 | 7 mg |
| $NaO_3S-CH(CH_2COOCH_2CH(CH_3)_2)COOCH_2CH_2COOCH_2CH_2CH_2CH_2CH_2CH_2CH_3$ | 7 mg |
| $C_{12}H_{25}CONH(CH_2CH_2O)_5H$ | 62 mg |
| 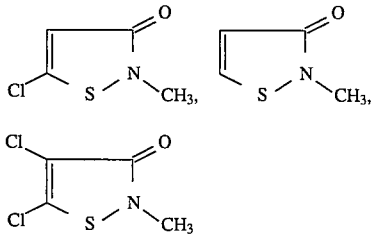 (50:46:4) | 0.9 mg |

The above-mentioned coating solutions were coated on the both sides of a 180 μm-thick polyethylene terephthalate film bases each subbed and colored in blue in advance, and the coated film bases were then dried up, so that samples No. 1 through No. 15 were prepared, respectively.

The amounts of silver and gelatin coated on every sample were so adjusted as to be 2.0 g/m$^2$ and 3.5 g/m$^2$ per the single side of the base, respectively.

Evaluation on aging preservability

Two (2) sets of the samples were prepared. On set of the samples was allowed to stand for one day, and the other set thereof was allowed to stand for 90 days. Each of the sets was then developed for the artificial, preservation tests. These samples were each sandwiched between x-ray photographic intensifying screens KO-250 (manufactured by Konica Corp.) and exposed to X-rays through a penetrator Model B. Thereafter, the samples were each developed with the following processing solutions under the following processing conditions, through an automatic processor.

| Formula of devoloper | |
|---|---|
| Part-A (for making 10.8 liters) | |
| Potassium hydroxide | 340 g |
| Potassium sulfite (in an 50% solution) | 2150 g |
| Diethylene tetramine pentaacetic acid | 32.3 g |
| Sodium hydrogen carbonate | 108 g |
| 5-methyl benzotriazole | 150 mg |
| 1-penyl-5-mercaptotetrazole | 15 mg |
| Hydroquinone | 280 g |
| Add water to make | 3600 ml |
| Part-B (for making 10.8 liters) | |
| Glacial acetic acid | 158 g |
| Triethylene glycol | 144 g |
| 1-penyl-3-pyrazolidone | 19.5 g |
| 5-nitroindazole | 0.32 g |
| n-acetyl-D,L-penicillamine | 0.11 g |
| Add water to make | 3600 ml |
| Formula for starter (for making 1.0 liter) | |
| Glacial acetic acid | 138 g |
| Potassium bromide | 325 g |
| 5-methyl benzotriazole | 1.5 g |
| $CH_3N(C_3H_6NHCONHC_2H_4SC_2H_5)_2$ | 20 mg |
| Add water to make | 1.0 l |

The resulting starter was added in an amount of 20 ml per 10.0 liters of the developer used.

| Formula of fixer | |
|---|---|
| Part-A (for making 16.4 liters) | |
| Ammonium thiosulfate (70 wt/vol %) | 3460 g |
| Sodium sulfite | 150 g |
| Sodium acetate.trihydrate | 350 g |
| Sodium citrate | 43 g |
| Gluconic acid | 33 g |
| Boric acid | 26 g |
| Glacial acetic acid | 120 g |
| Add water to make | 5000 ml |
| Part-B (for making 16.4 liters) | |
| Aluminium sulfate | 56 g |
| Sulfuric acid (50 wt %) | 91 g |
| Add water to make | 1000 ml |

The developer was prepared by adding Part-A and Part-B at the same time to about 3 liters of water. While the mixture thereof was being stirred, water was added thereto so as to make 10.8 liters. The pH thereof was adjusted to be 10.4 with glacial acetic acid. The resulting solution was used as the developer.

The fixer was prepared by adding Part-A and Part-B at the same time to about 3 liters of water. While the mixture thereof was being stirred, water was added thereto so as to make 16.4 liters. The pH thereof was adjusted to be 4.6 with NaOH. The resulting solution was used as the fixer.

| Processing step | Processing temperature (C.°) | Processing time (sec) | Replenishing amount |
|---|---|---|---|
| | Processing steps | | |
| Inserting | — | 1.2 | |
| Developing + cross-over | 35 | 14.6 | 270 ml/m$^2$ |
| Fixing + cross-over | 33 | 8.2 | 430 ml/m$^2$ |
| Washing + cross-over | 18 | 7.2 | 7.0 l/sec |
| Squeezing | 40 | 5.7 | |
| Drying | 50 | 8.1 | |
| Total: | — | 45.0 | |

With each of the resulting developed samples, the photosensitivity and fogginess thereof were evaluated. Each sensitivity was obtained from the reciprocal of a exposure energy necessary to give a density of a fog +1.0, and the photosensitivity of each sample was indicated by a value relative to the photosensitivity (regarded as a value of 100) of sample No. 1 allowed to stand for one day after coated.

Evaluation on Residual-coloring

A subject sample coated, but not exposed to light was developed in the same processing manner as in sensitometry, and the resulting residual color contamination was evaluated with the naked eye by the following 5 grades.

5: No residual color produced,

4: A few residual color produced,

3: Some residual color produced, but practically applicable,

2: Fairly many residual color produced, but it is narrowly within the limit of practical application 1: Many residual color produced and it is not practically applicable The results of the evaluation were shown in the following table.

and a fog increase can be inhibited in the course of preserving a raw stock of film, and that a sample can be so obtained as to reduce residual-coloring.

Example 2

3) Seed emulsion preparation 2

Into an aqueous 0.05N potassium bromide solution containing hydrogen peroxide-treated gelatin being violently stirred at 40° C., an aqueous silver nitrate solution and an aqueous equivalent mol-potassium bromide solution containing hydrogen peroxide-treated gelatin were each added. After elapsing 1.5 minutes, the temperature of the resulting mixture was lowered down to 25° C. by taking 30 minutes. Thereafter, aqueous ammonia (in a 28% solution) was added in an amount of 80 ml per mol of silver nitrate used, and the resulting mixture was kept stirred for 5 minutes. After the pH thereof was adjusted to be 6.0 with acetic acid, the desalting treatment was carried out in the same manner as aforementioned and an aqueous gelatin solution was the added thereto so that the resulting mixture could be redispersed.

The resulting seed emulsion was proved to be spherical-shaped grains having an average grain-size of 0.23 μm and a variation coefficient of 0.28.

4) Grain growth from seed emulsion

By making use of the above-mentioned seed emulsion, the grains were grown up in the following manner. An aqueous solution of potassium bromide and potassium iodide and an aqueous silver nitrate solution were each added to an aqueous solution containing ossein gelatin and disodium polyethyleneoxy-polypropyleneoxy-di-succinate, which was being violently stirred at 75° C., in a double-jet precipitation method.

In the course of carrying out the above-mentioned addition, the pH and pAg thereof were kept at 5.8 and 9.0, respectively. After completing the addition, the pH was adjusted to be 6.0 and exemplified compound 3 was added thereto in an amount of 400 mg/mol AgX so as to serve as a spectral sensitizing dye. Thereafter, a desalting treatment was carried out in the same manner as above and the desalted matter was dispersed in an aqueous gelatin solution.

TABLE 1

| Sample No. | Selenium compound | A* | Sensitizing dye [mmol/molAgX] | AgI/KI [mmol/molAgX] | | Sensitivity 1 day-aging | Sensitivity 90 days-aging | Fog 90 days-aging | Residual coloring | Remarks |
|---|---|---|---|---|---|---|---|---|---|---|
| 1 | 21 | 10:0 | 0.9 | — | — | 100 | 88 | 0.15 | 4 | Comp. |
| 2 | 21 | 10:0 | 0.9 | AgI | 0.5 | 100 | 96 | 0.1 | 4 | Comp. |
| 3 | 21 | 6:4 | 0.9 | AgI | 0.5 | 137 | 135 | 0.05 | 5 | Inv. |
| 4 | 21 | 4:6 | 0.9 | AgI | 0.5 | 145 | 143 | 0.05 | 5 | Inv. |
| 5 | 21 | 4:6 | 0.9 | KI (Comp.) | 3.0 | 102 | 89 | 0.07 | 5 | Comp. |
| 6 | 21 | 4:6 | 0.75 | AgI | 0.5 | 130 | 127 | 0.05 | 5 | Inv. |
| 7 | 4 | 4:6 | 0.9 | AgI | 0.5 | 144 | 142 | 0.05 | 5 | Inv. |
| 8 | 4 | 6:4 | 0.9 | AgI | 0.5 | 135 | 132 | 0.05 | 5 | Inv. |
| 9 | 4 | 0:1 | 0.9 | AgI | 0.5 | 158 | 156 | 0.05 | 5 | Inv. |
| 10 | 21 | 4:6 | 0.9 | AgI | 0.005 | 113 | 102 | 0.08 | 5 | Comp. |
| 11 | 21 | 4:6 | 0.9 | AgI | 0.01 | 122 | 116 | 0.06 | 5 | Inv. |
| 12 | 21 | 4:6 | 0.9 | AgI | 5.0 | 157 | 154 | 0.04 | 4 | Inv. |
| 13 | 21 | 4:6 | 0.9 | AgI | 12.0 | 164 | 161 | 0.04 | 3 | Comp. |
| 14 | 21 | 0:1 | 0.9 | AgI | 0.5 | 160 | 158 | 0.05 | 5 | Inv. |

*A: Molar ratio of a sulfur sensitizer to a selenium compound (sensitizer)

As is obvious from the contents of the above-given table, the invention was proved that a photosensitivity lowering Tabular-shaped silver iodobromide emulsions Em-2, Em-3 and Em-4 having an average silver iodide-content of 1.5 mol %, a projective area diameter of 0.96 μm, a variation coefficient of 25% and the aspect ratios (i.e., a ratios of a projective area diameter/a grain thickness) of 2.0, 3.5 and 5.0 were each prepared respectively in the same manner as above, except that the pAg and potassium iodide were changed.

To the resulting emulsions Em-2 through Em-4 and the aforementioned Em-1, the suitable amounts each of sodium thiosulfate, chloroauric acid, ammonium thiocyanate and a selenium sensitizer were added, and a chemical ripening treatment was applied at 48° C. to each of the mixtures. The amounts of the chemical sensitizers added thereto followed the amount thereof added in sample No. 3 of example 1. Immediately before adding the chemical sensitizer, a spectral sensitization was carried out by adding exemplified sensitizing dye 3 in an amount of 0.9 milli-mols per mol of silver halide used. After starting the chemical ripening treatment, KI was added by taking 30 minutes as shown in the following table 2 for comparing to a silver iodide fine grains relating to the invention and, further, a ripening treatment was carried out at the same temperature for 20 minutes and 4 -hydroxy-6-methyl-1,3,3a,7-tetrazaindene was added in an amount of 2.4 g per mol of silver halide used. Then, the temperature thereof was lowered down to stop the ripening treatment in operation. Next, the same additives as used in example 1 were each added to the 5 kinds of emulsions so that the coating solutions could be prepared and thereby the 5 kinds of samples could then be prepared. With the resulting samples, the preservability and residual color production were evaluated in quite the same manner as in example 1. The results thereof were shown in the following table 2.

TABLE 2

| Sample No. | Emulsion | Aspect ratio | AgI/KI [mmol/molAgX] | | Sensitivity 1 day-aging | Sensitivity 90 days-aging | Fog 90 days-aging | Residual coloring | Remarks |
|---|---|---|---|---|---|---|---|---|---|
| 16 | Em-1 | — | AgI | 0.5 | 144 | 143 | 0.05 | 5 | Inv. |
| 17 | Em-2 | 2.0 | AgI | 0.5 | 153 | 151 | 0.05 | 5 | Inv. |
| 18 | Em-3 | 3.5 | KI (Comp.) | 3.0 | 142 | 141 | 0.08 | 5 | Comp. |
| 19 | Em-3 | 3.5 | AgI | 0.5 | 165 | 164 | 0.05 | 5 | Inv. |
| 20 | Em-4 | 5.0 | AgI | 0.5 | 180 | 178 | 0.05 | 5 | Inv. |

As is obvious from the contents of the above-given table, it was proved that a photosensitivity lowering and a fog increase can be inhibited in the course of preserving a raw stock of film, and that a highly photosensitive silver halide photographic light-sensitive material can be so obtained as to reduce a residual color production, when applying the invention to a tabular-shaped silver halide grain emulsion.

What is claimed is:

1. A silver halide photographic light-sensitive material comprising a support having on at least one side thereof a silver halide emulsion layer comprising a silver halide emulsion containing silver halide grains, the silver halide emulsion being prepared by a process comprising:

(i) mixing a silver salt and a halide salt in a dispersing medium to form a silver halide emulsion, (ii) subjecting the emulsion formed to washing to remove water-soluble salt, and then (iii) carrying out chemical sensitization of the emulsion, wherein the emulsion is chemically sensitized by adding a selenium compound; and, in the step of (iii), silver iodide fine grains having a grain size not larger than 0.12 μm are added to the emulsion in an amount of $1\times10^{-5}$ to $1\times10^{-2}$ mol per mol of silver halide of the emulsion, the emulsion comprising silver iodobromide grains having an average silver iodide content of 0.5 to 3.0 mol %.

2. The photographic material of claim 1, wherein at least 50% of the total projected area of the silver halide grains are tabular grains having an average aspect ratio of grain diameter to grain thickness of 3 or more, the silver halide emulsion being spectrally sensitized with a sensitizing dye in an amount of $1\times10^{-4}$ to $1\times10^{-3}$ mol per mol of silver halide of the emulsion.

3. The photographic material of claim 1, wherein the selenium compound is a compound represented by formula (1) or formula (2),

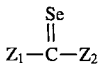

formula (1)

wherein $Z_1$ and $Z_2$ independently represent an alkyl group, an alkenyl group, an aralkyl group, an aryl group, a heterocyclic group, $—NR_1(R_2)$, $—OR_3$ or $—SR_4$, in which $R_1$ and $R_2$ independently represent a hydrogen atom, an alkyl group, an aralkyl group, an acyl group, an aryl group or a heterocyclic group, and $R_3$ and $R_4$ independently represent an alkyl group, an aralkyl group, an aryl group or a heterocyclic group,

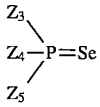

formula (2)

wherein $Z_3$, $Z_4$ and $Z_5$ independently represent a hydrogen atom, an aliphatic group, an aromatic group, a heterocyclic group, $—OR_7$, $—NR_8(R_9)$, $—SR_{10}$, $—SeR_{11}$, —X, in which $R_7$, $R_{10}$ and $R_{11}$ independently represent a hydrogen atom, an aliphatic group, an aromatic group, a heterocyclic group, or a cation; $R_8$ and $R_9$ independently represent a hydrogen atom, an aliphatic group, an aromatic group or a heterocyclic group; X represents a halogen atom.

4. The photographic material of claim 1, wherein said selenium compound is added to the emulsion in an amount of $1\times^{10-7}$ to $3\times10^{-5}$ mol per mol of silver halide of the emulsion.

5. The photographic material of claim 1, wherein the silver halide emulsion is chemically sensitized further by adding a sulfur sensitizer and a gold sensitizer.

6. The photographic material of claim 1, wherein the silver halide emulsion is chemically sensitized in the presence of a silver halide solvent selected from a thioether, a thiourea, an imidazole, a sulfite and a thiocyanate.

7. The photographic material of claim 2, wherein said sensitizing dye is added at a time within a period from the time after washing the emulsion to the time before completing the chemical sensitization.

8. The photographic material of claim 1, wherein the silver iodide fine grains are not larger than 0.09 μm.

9. The photographic material of claim 1, wherein the silver iodide fine grains are not larger than 0.06 μm.

10. The photographic material of claim 3, wherein at least 50% of the total projected area of the silver halide grains are tabular grains having an average aspect ratio of grain diameter to grain thickness of 3 or more, the silver halide emulsion being spectrally sensitized with a sensitizing dye in an amount of $1\times10^{-4}$ to $1\times10^{-5}$ mol per mol of silver halide of the emulsion; and wherein said selenium compound is added to the emulsion in an amount of $1\times10^{-7}$ to $3\times10^{-5}$ mol per mol of silver halide of the emulsion.

11. The photographic material of claim 10, wherein the silver iodide fine grains are not larger than 0.09 μm.

12. The photographic material of claim 11, wherein the silver iodide fine grains are not larger than 0.06 μm.

* * * * *